UNITED STATES PATENT OFFICE.

GADIENT ENGI AND CARL JAGERSPACHER, OF BASEL, SWITZERLAND, ASSIGNORS TO SOCIETY OF CHEMICAL INDUSTRY IN BASLE, OF BASEL, SWITZERLAND.

CHROMIUM COMPOUND OF AZO DYESTUFFS AND A PROCESS OF MAKING SAME.

1,242,536.     Specification of Letters Patent.     Patented Oct. 9, 1917.

No Drawing. Original application filed November 29, 1915, Serial No. 64,023. Divided and this application filed August 3, 1916. Serial No. 112,950.

*To all whom it may concern:*

Be it known that we, Dr. GADIENT ENGI and Dr. CARL JAGERSPACHER, both chemists, citizens of the Swiss Republic, and residents of Basel, Switzerland, have invented new Chromium Compounds of Azo Dyestuffs and Processes of Making Same, of which the following is a full, clear, and exact specification.

This application is a divisional one of our application for Letters Patent Ser. No. 64,023, filed November 29, 1915.

We have found that the new chromium compounds of azodyestuffs containing at least one group able to combine with chromium which can be obtained, according to our application for Letters Patent Ser. No. 64023, filed November 29, 1915, by combining the hitherto unknown chromium compound of an orthooxydiazobody with an azodyestuff component containing at least one group able to be chromated, can be converted into chromium compounds wherein all of the groups able to combine with chromium are saturated with chromium, by treating a hot aqueous solution or suspension of the said half chromated dyestuffs with a chromium compound as for instance chromium oxid or a chromium salt. The thus obtained saturated chromium compounds of orthooxyazodyestuffs constitute intense colored powders dissolving in water to intense colored solutions which do not undergo any essential change by adding sodium carbonate or soda lye. They dye animal fiber in an acid bath fast tints which are not changed when subsequently chromated.

The process for the manufacture of these compounds is illustrated by the following examples:

Example 1: 15.4 parts 4:2:1-nitroaminophenol are heated with 350 parts water, 13.6 parts crystallized sodium acetate and 11 parts chromium fluorid for 3 to 4 hours at 100° C. in a vessel provided with a reflux cooler. After the mass is completely cooled down, the residue is separated by filtration and the filtered liquid saturated with common salt. The easily soluble chromium compound of 4:2:1-nitroaminophenol separates progressively as a yellow-brown precipitate. It is diazotized in the known manner and the resulting diazobody is combined with 1:8:3:6-aminonaphtholdisulfonic acid in a sodaalkaline solution. The obtained dyestuff solution is filtered hot and the half chromated dyestuff is precipitated from the filtered liquid by adding common salt. The dyestuff can, if desired, be purified by redissolution. 2.5 parts of this half chromated dyestuff are added to a solution of 2.5 parts chromium fluorid in 60 parts boiling water. The violet solution turns quickly to blue-violet and after a certain boiling to blue-green. After a boiling for ¾ of an hour, 6 parts crystallized sodium acetate are added, and the liquid is separated hot by filtration and suction from the undissolved residue, evaporated to about 25 parts and the chromium compound is precipitated from it by adding 6 parts common salt. After the mass has been allowed to stand for a long time, the chromium compound is separated by filtration and suction, slightly washed and dried. It dyes wool and other animal fiber in an acid bath pure green tints very fast to alkalis, light, washing, fulling and potting, dissolves in water to a green-blue solution, in concentrated sulfuric acid to red-blue solutions and in alcohol to green-blue solutions.

Example 2: 18.9 parts 2:1:4-aminophenolsulfonic acid are transformed with 300 parts water and 4 parts sodium hydroxid into the corresponding sodium salt. The filtered solution is united to a filtered solution of 10.5 parts chromium fluorid in 100 parts water and to a similar solution of 27.2 parts crystallized sodium acetate and the whole is heated for about 4 hours on a water bath. The resulting chromium compound is very easily soluble, its solution is concentrated, diazotized in the known manner and combined with a soda alkaline solution of sodium-betanaphtholate. The solution of dyestuff is heated in order to dissolve the partly separated dyestuff and filtered; from the filtered liquid the dyestuff is precipitated by addition of common salt and eventually purified by redissolution. 5 parts of this half chromated dyestuff are dissolved in 100 parts hot water, and to the thus obtained solution 12 parts sodium acetate and 2.5 parts chromium fluorid are added, whereby the blue-red solution becomes more yellow. Hereafter the mass is slightly boiled for about 1 hour, the hot liquid separated from the residue by filtration and suction, the filtered liquid concentrated by evaporation and the resulting chromium compound separated by addition of common salt. It dyes wool in an acid bath vivid violet tints of excellent fastness. It dissolves in water with violet red coloration, in concentrated sulfuric acid with red-blue coloration and in alcohol with violet-red coloration.

Example 3: 19.9 parts picramic acid are boiled with 1750 parts water, 10.5 parts chromium fluorid and 13.6 parts crystallized sodium acetate, for about 15 hours, in a vessel provided with a reflux cooler and then filtered hot. There remains a residue I. The filtered liquid is concentrated by evaporation, whereby a precipitate II separates, which is isolated by filtration and suction. Both parts I and II of the new chromium compound are diazotized in known manner and united with a sodaalkaline solution of 1:8:2:4-aminonaphtholdisulfonic acid. In both cases the difficultly soluble dyestuff is precipitated and is separated by filtration from the mother-lye free of dyestuff. The dyestuff is then extracted with water, the thus obtained solution is filtered and from the filtered liquid the dyestuff is isolated by adding common salt. 3 parts of this half chromated dyestuff are dissolved in 60 parts hot water and to the thus obtained violet-blue solution are added 1.5 parts chromium fluorid and 3 parts sodium acetate. The whole is heated for a short time, whereby the coloration of the reaction mass turns to blue-green. After a boiling of 1 hour, the hot liquid is separated from the residue by filtration and suction, evaporated to the half of its volume and salted out. The obtained entirely chromated dyestuff dyes wool in acid bath yellowish-green tints of excellent fastness. It dissolves in concentrated sulfuric acid with violet-red coloration, in water and in alcohol with green colorations.

Instead of the chromium fluorid specified in the examples other salts of chromium as chromium chlorid, chromium sulfate, etc., can be employed.

The chromium compounds able to be prepared according to the described process can be employed for instance for producing fast tints on the animal fibers according to the process of U. S. application for Letters Patent Ser. No. 63827, filed November 27, 1915.

What we claim is:

1. The described process for the manufacture of chromium compounds of orthooxyazodyestuffs consisting in treating an orthoaminophenol compound with a chromium compound in a hot aqueous medium, diazotizing the thus obtained chromium compound of orthoaminophenol compound, combining the resulting chromium compound of orthooxydiazobody with an azodyestuff component containing at least one group able to be chromated, and treating finally the thus obtained half chromated orthooxyazodyestuff in a hot aqueous medium with a chromium compound.

2. The described process for the manufacture of chromium compounds of orthooxyazodyestuffs consisting in treating an orthoaminophenol compound with a chromium compound in a hot aqueous medium, diazotizing the thus obtained chromium compound of orthoaminophenol compound, combining the resulting chromium compound of orthooxydiazobody with a naphtholic compound and treating finally the thus obtained half chromated orthooxyazodyestuff in a hot aqueous medium with a chromium compound.

3. The described process for the manufacture of chromium compounds of orthooxyazodyestuffs consisting in treating an orthoaminophenol compound with a chromium compound in a hot aqueous medium, diazotizing the thus obtained chromium-compound of orthoaminophenol compound, combining the resulting chromium compound of orthooxydiazobody with an aminonaphtholsulfonic compound and treating finally the thus obtained half chromated orthooxyazodyestuff in a hot aqueous medium with a chromium compound.

4. As new products, the described chromium compounds of orthooxyazodyestuffs, in which all groups able to combine with chromium are saturated with chromium, dyeing animal fibers in acid baths fast dyeings which are not changed when subsequently chromated, and constituting intense colored powders dissolving in water to intense colored solutions which do not undergo any essential change by adding sodium carbonate or soda lye.

5. As new products, the described chromium compounds of orthooxyazodyestuffs derived from an orthodiazophenol compound and a naphtholic compound and in which all groups able to combine with chromium are saturated with chromium, dyeing animal fibers in acid bath fast dyeings which are not changed, when subsequently chromated and constituting intense colored powders dissolving in water to intense colored solutions which do not undergo any essential change by adding sodium carbonate or soda lye.

6. As new products the described chromium compounds of orthooxyazodyestuffs derived from an orthodiazophenol compound and an aminonaphtholsulfonic compound and in which all groups able to combine with chromium are saturated with chromium, dyeing animal fibers in acid baths fast dyeings which are not changed when subsequently chromated and constituting intense colored powders dissolving in water to intense colored solutions which do not undergo any essential change by adding sodium carbonate or soda lye.

In witness whereof we have hereunto signed our names this 12th day of July 1916, in the presence of a subscribing witness.

Dr. GADIENT ENGI.
Dr. CARL JAGERSPACHER.
Witness:
AMAND RITTER.